United States Patent [19]

Lackner et al.

[11] Patent Number: 5,308,288
[45] Date of Patent: May 3, 1994

[54] VACUUM SWEEPER DRIVE BELT

[75] Inventors: John R. Lackner, Westlake; Alfred Schiazza, Avon Lake, both of Ohio

[73] Assignee: The Scott Fetzer Company, Westlake, Ohio

[21] Appl. No.: 920,767

[22] Filed: Jul. 28, 1992

[51] Int. Cl.⁵ .................................................. F16H 57/00
[52] U.S. Cl. ........................................ 474/92; 474/93; 474/246; 474/250; 15/352; 15/372; 15/389
[58] Field of Search .................... 474/61, 62, 92, 93, 474/153, 167–170, 184, 188, 237, 246, 250, 251, 265; 15/99, 250.24, 250.25, 366, 388, 391, 389, 390, 352, 372

[56] References Cited

U.S. PATENT DOCUMENTS

| | | | |
|---|---|---|---|
| 137,224 | 3/1873 | Mansfield | 474/250 X |
| 1,028,783 | 6/1912 | Von Rabenau | 474/251 |
| 1,890,080 | 12/1932 | Freedlander | 474/251 |
| 2,203,463 | 6/1940 | Gerber | 474/93 |
| 2,221,984 | 11/1940 | McKay . | |
| 2,405,496 | 8/1946 | Gingres . | |
| 2,912,722 | 11/1959 | Howell . | |
| 3,129,553 | 4/1964 | Weaver . | |
| 3,242,750 | 3/1966 | Graft | 474/250 |
| 3,656,360 | 4/1972 | Fix | 474/265 X |
| 4,003,269 | 1/1977 | Haines | 474/250 |
| 4,034,615 | 7/1977 | Brooks | 74/229 |

Primary Examiner—Ramon S. Britts
Assistant Examiner—Roger J. Schoeppel
Attorney, Agent, or Firm—Watts, Hoffmann, Fisher & Heinke

[57] ABSTRACT

An endless elastomeric vacuum sweeper belt for use in a vacuum sweeper having a diamond pattern drive surface. A first set of ribs project inwardly in a substantially diagonal direction along the drive surface of the belt. A second set of ribs project inwardly along the drive surface of the belt in a substantially diagonal direction opposite the direction of the first set of ribs. The first and set second set of ribs together define a diamond-like pattern on the drive surface as well as a number of particle recesses for the temporary collection of matter. Each rib includes knife-like edge portions to increase the traction of the belt on a drive surface by cutting, loosening and expelling foreign matter lodged between the belt drive surface and the rotation member and/or the drive source of the vacuum sweeper.

16 Claims, 2 Drawing Sheets

VACUUM SWEEPER DRIVE BELT

FIELD OF THE INVENTION

This invention relates to a drive belt for a vacuum sweeper.

BACKGROUND ART

Elastomeric endless power transmission belts are well known and widely used in apparatus such as yarn-processing machines, combustion engines, and vacuum sweepers. Historically, drive belts were made from leather or cloth belting sewn together at the ends to define an endless loop. Over time, more elastic and less expensive materials, i.e. synthetic rubber, has been substituted for leather and cloth in the manufacture of drive belts.

Modern vacuum sweeper belts are typically cylindrical or rectilinear in shape to maximize the surface of the belt which drivingly engages the brush roll of the sweeper. The belt drive surface is usually smooth, unperforated and free of any traction enhancing features. One historical problem with the design of vacuum sweeper drive belts is caused by the collection of dirt, hair carpet fibers and other foreign matter on the brush roll during operation of the sweeper. The matter works its way between the drive surface of the belt and the bunch roll reducing the traction, and increasing the slippage, of the drive belt on the brush roll. The reduced traction results in slower revolutions of the brush roll during sweeper operation, significantly decreasing the volume of dirt and other matter picked up by the sweeper.

A variety of drive belts have been designed to overcome specific problems with the apparatus on which they are deployed. U.S. Pat. No. 4,034,615 discloses a drive belt having rhomboidally or trapezoidally shaped teeth disposed on the belt drive surface which operates without creating the siren-like noise characteristic of toothed belts.

The apparatus disclosed in U.S. Pat. No. 3,129,553 is designed to prevent the accumulation of lint on a spindle drive tape during the operation of yarn-processing machines by passing the drive surface of the tape over an idler roll having knurled surface. The knurled surface and the centrifugal force of the idler roll contact to remove lint from the tape surfaces.

U.S. Pat. No. 2,912,722 discloses a drafting apron having a plurality of ribs disposed on the apron drive surface. The ribs extend diagonally along the inner surface of the apron to define a criss-cross diamond-like pattern on the inner surface of the apron.

None of the aforementioned belt features have been applied to vacuum sweeper drive belts to improve belt traction on the vacuum brush roll to eliminate the negative effects of unwanted matter accumulation on the roll.

SUMMARY OF THE INVENTION

A drive surface of a vacuum sweeper drive belt includes a plurality of ribs which define a diamond patterned surface to improve the belts traction on the brush roll of a vacuum sweeper. A first set of ribs project inwardly from the drive surface in a diagonal direction and a second set of ribs are disposed diagonally in the opposite direction to the first set of ribs to define the diamond-like pattern. Each rib includes converging surfaces which define knife-like edges. The knife-like edges increase the traction of the belt on the brush roll by cutting, loosening and expelling foreign matter lodged between the brush roll and the inner belt drive surface. The ribs also define a plurality of particle recesses on the inner surface of the drive belt for the temporary collection of matter loosened by the knife-like edges.

BEST MODE FOR PRACTICING THE INVENTION

Figure 1:
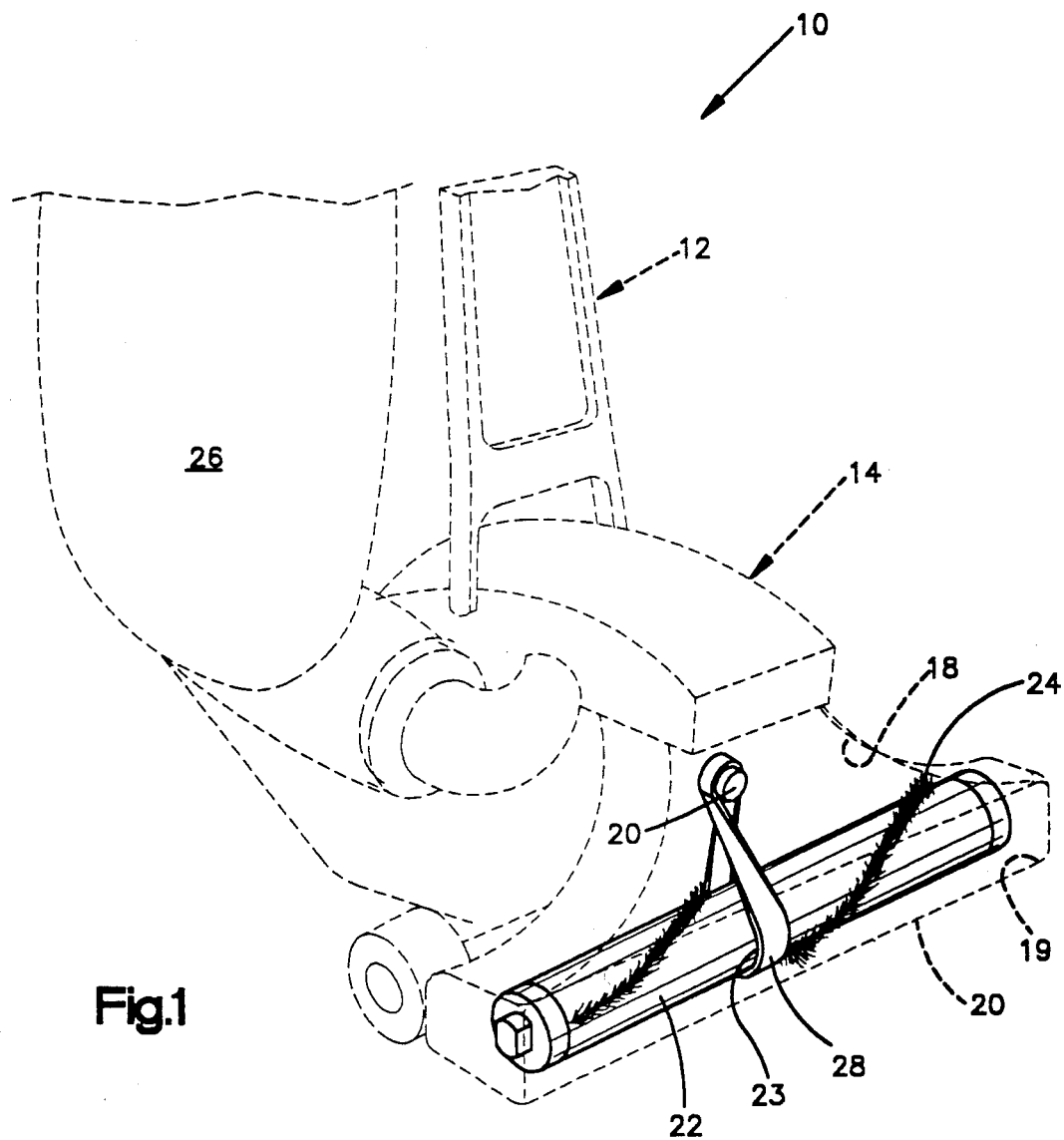
FIG. 1 is a perspective view of a vacuum sweeper, shown in phantom, illustrating the relationship between the vacuum sweeper drive source, the drive belt and a brush roll.
Figure 2:
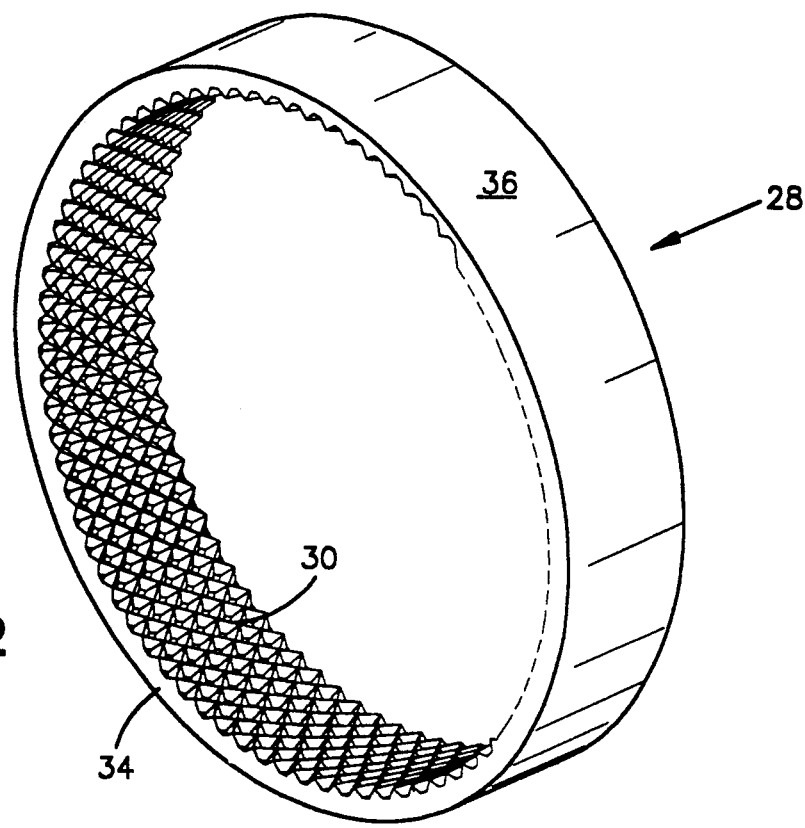
FIG. 2 is an enlarged perspective view of the drive belt of FIG. 1.

With reference to the drawings, a typical upright vacuum sweeper 10 is shown in broken lines in FIG. 1. The vacuum sweeper 10 comprises a handle 12 which is pivotally connected to a wheeled housing 14. The housing 14 includes a dust channel 18 and a nozzle 19. A power source (not shown) having a drive shaft with a belt receiving end 20 is mounted within the housing 14 and extends into the dust channel 18. A rotor (not shown) is typically secured to the central portion of the drive shaft to draw air into the nozzle 19. A dust bag 26 is flexibly connected to the dust channel 18 to receive the dirt-laden air generated during operation of the sweeper 10.

A brush roll 22 having bristles 24 along its length is rotatably mounted within the nozzle 19. A vacuum sweeper drive belt 28 is wrapped around the belt-receiving end 20 of the drive shaft and the central drive surface 23 of the brush roll 22. The bristles 24 function to agitate the rug or other like surface being cleaned to loosen the dirt so that the dirt can be drawn by the flow of air into the nozzle 19 and deposited in the dust bag 26.

The vacuum sweeper belt 28 includes a drive surface 30, edges 34, and an exterior surface 36. The drive surface 30 engages the belt-receiving end 20 of the drive shaft and surrounds the brush roll central drive surface 23 in driving relationship. The perpendicular orientation of the belt-receiving end 20 and the brush roll 22 creates a figure 8 path for the belt 28.

The drive belt 28 is constructed in a manner that reduces the tendency of dirt, hair, etc. from accumulating on the brush roll 22 and the belt-receiving end 20 of the drive shaft with resulting reduction of traction. In accordance with the invention, the belt drive surface 30 includes a first set of ribs 38 which project inwardly and extend in a substantially diagonal direction. A second set of ribs 40 project inwardly and are disposed in a substantially opposite diagonal direction to the first set of ribs 38 to form a diamond pattern on the drive belt surface 30. The first and second sets of ribs 38, 40 also define a plurality of recesses 42 on the belt drive surface 30 that function to temporarily collect dirt and other matter during the operation of the sweeper 10.

Figure 3:
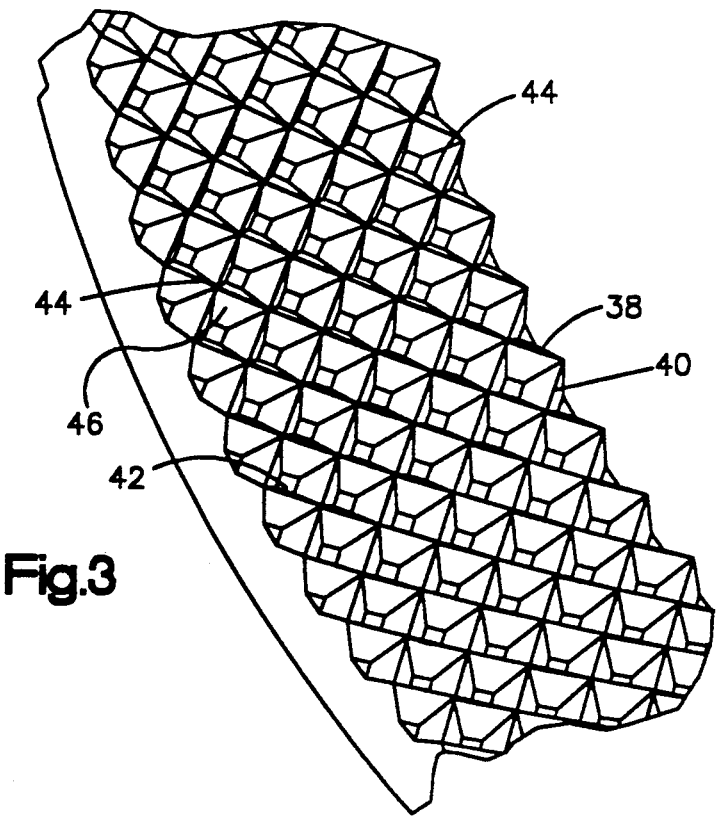
FIG. 3 is an enlarged fragmentary view of the drive surface of the drive belt of FIG. 2.

As shown in FIG. 3, the first and second sets of ribs 38, 40 have converging tapered portions 43 which define knife-like traction edges 44. The edges 44 increase the traction of the belt on the central brush roll drive surface 23 and on the belt receiving end 20 by cutting, loosening and expelling foreign matter lodged between the drive surface 30, the belt receiving end 20 and the brush roll drive surface 23 during operation of the sweeper 10. Loosened matter is temporarily collected in the belt recesses 42 until the twisting figure 8 path of the belt 28 loosens and dispels the collected matter from the recesses 42. Thereafter, the air flow dislodges and deposits the collected matter in the dust bag 26.

While a preferred embodiment of the invention has been described with particularity, modifications or alterations may be made therein without departing from the spirit and scope of the invention set forth in the appended claims.

What is claimed is:

1. In combination with a vacuum sweeper, an endless elastomeric drive belt having a drive surface comprising:
    a) a first set of ribs disposed along and projecting inwardly from other portions of the drive surface, each of the ribs being oriented in a substantially diagonal direction in relation to the direction of travel when the belt is in use;
    b) a second set of ribs disposed along and projecting inwardly from said other portions of the drive surface, said second set of ribs being oriented in a substantially diagonal direction transverse to the direction of travel and to the first set of ribs, said first and second sets of ribs defining boundaries of recesses in said other portions of the drive surface; and
    c) said ribs having converging tapered portions which define cutting edges.

2. The cleaner of claim 1 wherein the projecting portions delineate a diamond pattern.

3. In combination, a vacuum cleaner comprising a nozzle housing having an inlet, a filter, a vacuum source for creating air flow through said inlet to said filter, a brush roll rotatable in said housing, a motor shaft, and a drive belt entrained around said shaft and brush roll, said belt having narrow traction ridges engaging said shaft and brush roll and multiple recesses defined by said narrow traction ridges, whereby dirt drawn into said inlet is inhibited from causing said belt to slip and is displaced from under the traction surfaces at least in part into said recesses and then dispersed into the air stream flowing to said filter.

4. A vacuum sweeper having a handle pivotally connected to a wheeled housing, and a dust bag, said housing supporting a power drive shaft and a rotatable brush roll, the improvement comprising:
    a) a vacuum sweeper drive belt having a drive surface, said drive surface surrounding said drive shaft and brush roll in driving relationship, said drive surface having a first set of ribs disposed to project inwardly in a substantially diagonal direction with reference to the direction of the drive surface, when in use, and a second set of ribs being disposed to project inwardly in a substantially diagonal direction transverse to the direction of said first set of ribs and said direction of the drive surface to define a diamond pattern on the drive surface of the belt, said ribs having tapered side surfaces defining cutting edges to expel foreign matter lodged between the drive surface of the belt and the brush roll.

5. In a vacuum sweeper, a flexible, elastic drive belt having a plurality of inwardly projecting diamond shaped traction members, said diamond shape being with reference to the direction of travel when the belt is in use, said members having tapered surfaces defining cutting edges for expelling foreign matter lodged between the drive surface and a vacuum sweeper brush roll.

6. The drive belt of claim 5 wherein the traction members define a plurality of particle recesses.

7. In combination,
    a) a vacuum sweeper having a power drive shaft and a brush roll;
    b) an endless elastomeric power drive belt around the power drive shaft and the brush roll for continuous operation when the sweeper is in use;
    c) the belt including a drive surface including a plurality of traction ribs, said ribs having converging tapered portions which define cutting traction edges to expel forcing matter lodged between the drive surface and the power drive shaft and between the drive surface and the brush roll; and,
    d) said ribs defining boundaries of particle recesses which function to provide the temporary collection of foreign matter.

8. A vacuum cleaner comprising:
    a) a housing;
    b) a brush roll journalled in the housing for rotation when in use about an axis generally paralleling a surface to be cleaned;
    c) a driven element journalled in the housing for rotation about an element axis;
    d) an endless brush drive belt stretched around the brush roll and the driven element;
    e) the belt having an inner drive surface including inwardly projecting portions and recesses delineated by the projecting portions; and,
    f) the projecting portions including engagement surfaces providing belt to brush roll and belt to driven element frictional engagement while surfaces of the recesses remain in spaced relationship with the brush roll and driven element whereby rotational forces are transmitted from the driven element to the brush roll via the engagement surfaces and dirt is displaced into the recesses by the action of the engagement surface.

9. The cleaner of claim 8 wherein the element axis is orthogonal to an imaginary plane including the brush roll axis.

10. The cleaner of claim 9 wherein the belt is twisted and in a configuration generally in the shape of a figure 8.

11. The cleaner of claim 8 wherein the projecting portions delineate a diamond pattern oriented diagonally with reference to the direction of belt travel when in use.

12. The cleaner of claim 8 wherein the projections taper to cutting edges whereby to facilitate foreign matter penetration by the engagement surfaces.

13. The cleaner of claim 8 wherein the belt is positioned in the path of flowing air drawing foreign particles into a filter bag.

14. A process in inhibiting the development of foreign matter film on a vacuum cleaner brush roll, a brush belt and a drive member comprising:
    a) tensioning the belt around the roll and member to establish surface contact between inwardly extending projections on the belt and the roll and member respectively;
    b) rotating the member to thereby drive the belt and the roll and thereby cease the projections to disperse forcing matter into belt recesses interspersed among the projections; and, c) flexing the belt as it passes through a flow of air from a cleaner inlet to a filter whereby to cause foreign matter in such recesses to be transferred to such filter.

15. The process of claim 14 wherein the projections are in a diamond pattern with the projections oriented diagonally whereby each projection progressively establishes surface contact respectively with the element and the roll as the element and roll rotate.

16. The process of claim 14 wherein the projections are knife like to enhance foreign matter penetration as the projections engage the roll and element.

* * * * *